United States Patent Office 2,926,753
Patented Mar. 1, 1960

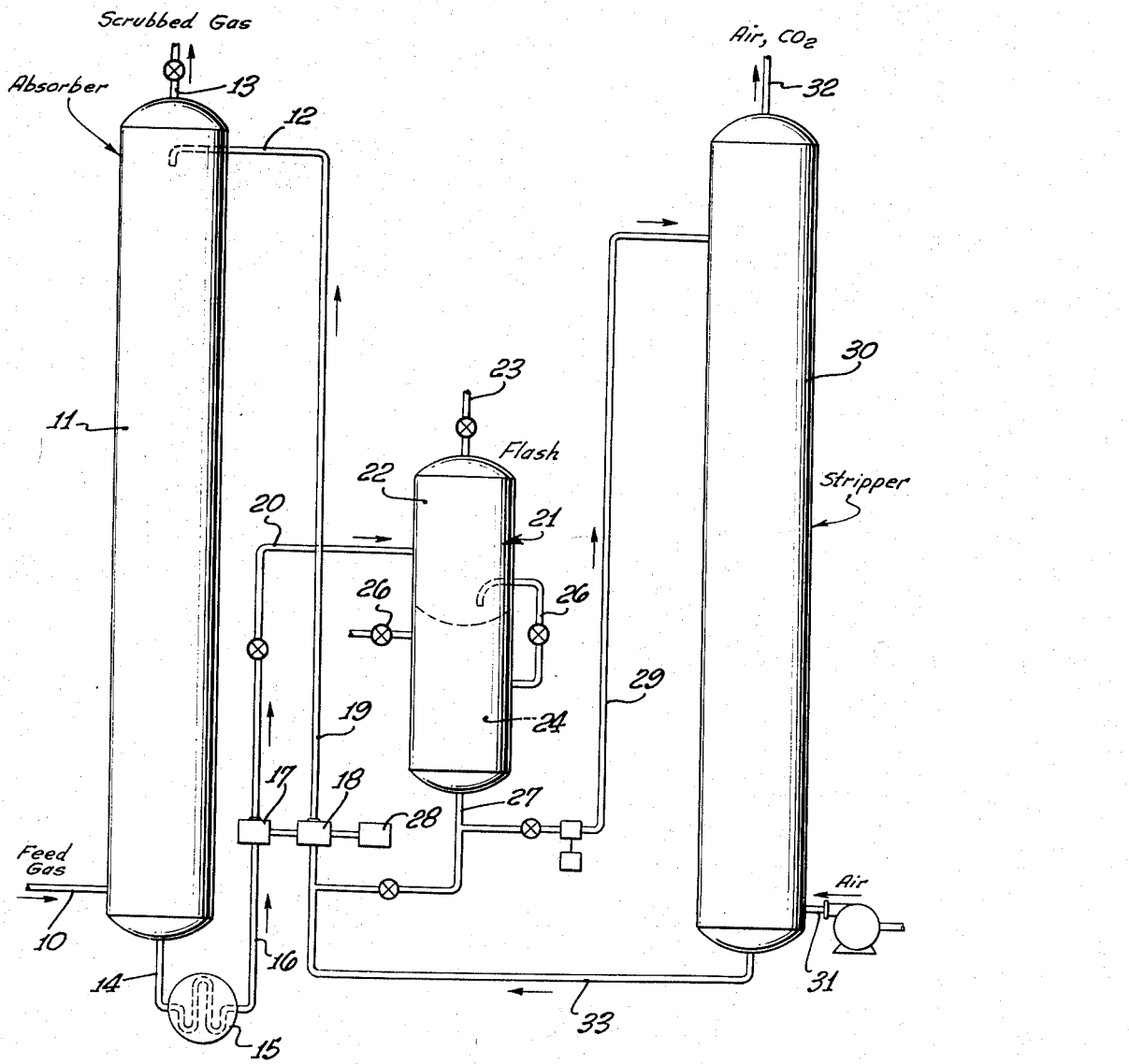

2,926,753

PROCESS FOR CARBON DIOXIDE ABSORPTION

Arthur L. Kohl and Frederick E. Miller, Whittier, Calif., assignors to The Fluor Corporation, Ltd., Los Angeles, Calif., a corporation of California Application October 6, 1958, Serial No. 765,649

11 Claims. (Cl. 183—115)

This invention relates to the removal of carbon dioxide from gaseous mixtures containing one or more additional components such as natural gas, hydrogen, nitrogen, oxygen, moisture and small amounts of acid gases, e.g. hydrogen sulfide, sulfur dioxide and carbonyl sulfide. Particularly, the invention is concerned with scrubbing carbon dioxide from such gaseous mixtures at high carbon dioxide partial pressures permitting, by use of the absorbent or solvent employed, efficient carbon dioxide removal by its selective solubility, without chemical reaction, in the solvent, and all in a manner obviating the requirement for the costly equipment and operating requirements for cyclular processes employing chemically reactive solvents, typically the well-known amine processes.

The present invention has for its major object to accomplish carbon dioxide stripping by the use of certain solvents characterized by their superior capacity for simple physical absorption of carbon dioxide, stability under all normal operating conditions, particular suitability for use in a circulatory system by reason of desirably low viscosity, the ease with which they release moisture and therefore minimize corrosion problems, and the capacity of the solvent for flash release of absorbed gases by simple pressure reduction in one or more stages.

These advantages are gained by the use of ether or mixtures of ether acetates consisting of diethylene glycol monobutyl ether acetate, termed also butoxy diethylene glycol acetate, $(CH_3COO(CH_2CH_2O)_2C_4H_9)$, and methoxy triethylene glycol acetate $$(CH_3COO(CH_2CH_2O)_3CH_3)$$

Of these, the diethylene glycol monobutyl ether acetate is presently preferred because of its lower cost. Hereinafter these solvents may be referred to collectively as the glycol acetate solvents.

Heretofore, it has been recognized that the use of some polyglycols such as dimethoxy tetraethylene glycol for carbon dioxide stripping gives rise to corrosion and reduced solubility for carbon dioxide, by reason of the tendency of the solvent to retain moisture. To overcome these difficulties it has been necessary to provide evaporator facilities for removing the water. The present glycol acetates are far less hygroscopic, so much so that they can be rendered self-drying by proper process design, and thus obviate serious corrosion problems and assure production of a treated gas having low humidity. This is an important advantage in natural gas treating where hydrate formations usually require drying equipment. Thus the unusual hygroscopic properties of the present glycol acetate solvents are ideally suited to drying of the gas during carbon dioxide removal, in that the solvent has the capacity for absorbing small amounts of water from the gas stream and yet permit evaporation of the water easily as the absorbed components are flashed off at reduced pressure.

These glycol acetates have a high degree of solubility for $H_2S$, COS and $SO_2$ gases as well, which will be removed with the carbon dioxide and flashed. Where the acid gas concentration of the scrubbed gas is intended to be a minimum, air or other inert gas stripping may be used to completely remove these contaminants before returning the solution to the absorption column. This can also enable the scrubbing of carbon dioxide from gases to proceed well below the 0.1 percent carbon dioxide level. The latter is an important feature for ammonia synthesis gas which must be free of carbon dioxide to a very low level if proper process operation is to be maintained.

Diethylene glycol monobutyl ether acetate has a solubility for carbon dioxide at atmospheric pressure and 80° F. of 3.1 s.c.f./c.f. Higher pressures result in more than proportional increases in solubility, as is shown in the following table:

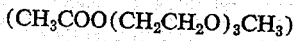

| Carbon Dioxide Pressure p.s.i.a. | Carbon Dioxide Solubility s.c.f./c.f. at 80° F. |
|---|---|
| 14.7 | 3.1 |
| 147 | 36 |
| 300 | 89 |
| 600 | 312 |

The advantage of the present process for scrubbing carbon dioxide at superatmospheric pressures is high when it is considered against chemical solvents such as amines or alkali carbonates which have a carrying capacity of 20–30 s.c.f./c.f. more or less independent of pressure. In practice we find the present physical solvent process operates best between 40 and 600 p.s.i. carbon dioxide pressures. Above 600 p.s.i. carbon dioxide partial pressure the carbon dioxide can be liquefied with refrigeration and degassed more cheaply although even here the residual inert gas usually contains carbon dioxide in the most effective pressure range for our process. Our practice further indicates that the absorber rich liquor should be between 30 and 120° F. for best operation. At temperatures much below 30° F. viscosity becomes a problem in the atmospheric flash, and at temperatures considerably over 120° F. vapor losses may become a problem.

The operation of the invention will be understood to better advantage by reference to the accompanying drawing showing in flow sheet form a typical embodiment.

Synthesis gas containing for example carbon dioxide and one or more additional components such as hydrogen, is fed through line 10 into the base of an absorber 11 for upward flow through trays, packing or any of various known methods for effecting intimate contact between the gas and the down-flowing glycol acetate solvent introduced near the top of the column through line 12. As previously indicated, the pressure in the absorber is maintained at a level corresponding to from 60 to 600 p.s.i. carbon dioxide partial pressure with feed gas. The scrubbed gas leaving the absorber through line 13 will have a reduced carbon dioxide content approaching the equilibrium vapor pressure of carbon dioxide over the solution fed to the absorber to an extent depending on the number of theoretical contacts therein. The rich solution leaving the base of the absorber through line 14 and having its temperature increased by the heat of solution, may be cooled if desired in exchanger 15 to maintain a temperature of the rich solution that may range between 30 and 100° F. Flowing from the cooler through line 16, the solution may pass through an expansion turbine or other power recovery device 17 to recover power that would otherwise be lost in large scale operations where the principal utility cost is the power needed by pumping the solution. Here the turbine is shown to drive pump 18 in the lean solution return line 19.

The liquid and gas released from the turbine through line 20 are vented into one or more flash chambers operating at reduced pressure to separate carbon dioxide from the solvent. Ultimately, the flashing occurs at substantially atmospheric pressure, and the pressure reduction may occur in a single stage or flash chamber where the only consideration is removal of carbon dioxide by the pressure reduction. Otherwise the flashing may occur say in two stages, the first serving to flash-off components more volatile than carbon dioxide, and the second to flash-off carbon dioxide at substantially atmospheric pressure. Merely as illustrative, the flash-off facility is shown to comprise a tank 21 containing a first higher pressure flash chamber 22 from which the released gases escape through outlet 23, and a second substantially atmospheric flash chamber 24 fed from chamber 22 through valved line 25, the released carbon dioxide being vented off through outlet 26.

Beyond the flash stage the lean solution in line 27 may be returned by pump 18 (driven either by turbine 17 or an independent motor 28) through line 19 to the absorber. Alternately, the solution may be discharged through line 29 to the top of an atmospheric stripper column 30 for downward passage in contact with air or other inert stripping gas introduced to the base of the column at 31. The stripping gas and any residual carbon dioxide removed from the solvent are discharged from the column through outlet 32, and the fully stripped solvent is returned through line 33 to the pump 18. It is to be understood that gas stripping of the solvent and removal of residual carbon dioxide is to be regarded as a typical means to this end, and that the invention contemplates other alternate expedients, wherever desirable, such as evacuation of the solvent to remove the last traces of any residual absorbed gas.

The decision as to whether a stripping operation is to be employed in any instance, depends upon the partial pressure (or percent of the carbon dioxide composition) desired in the absorbed off gas in line 13. When the stripper is employed, the solvent may be contacted with air or other inert gas say usually from about 1 to 5 s.c.f. per gallon of solution treated, thus to remove all or the bulk of the residual carbon dioxide. The more stripping gas used the shorter the column 30 may be to perform a given removal. We prefer to use a reasonably tall stripper (approximately 30 feet of packing in a commercial tower) which permits the use of a low gas to liquid ratio of say 1 s.c.f. per gallon, and thus avoid bringing the solution to temperature and humidity equilibrium with the stripping gas.

The following examples are cited as examples of specific operating conditions under which the process may be carried out in practice.

Example I

A 41.3 percent carbon dioxide in hydrogen synthesis gas saturated with water at 330 p.s.i.g. and 75° F. was fed into the bottom of a one inch diameter absorber filled with 11'0" of ¼" Raschig rings. A solution of diethylene glycol monobutyl ether acetate saturated with carbon dioxide at one atmosphere pumped into the top of the absorber countercurrently scrubbed the gas of carbon dioxide. Approximately 83 gallons per M c.f. of inlet gas was used and the overhead gas contained 5.0 percent carbon dioxide. The rich solution upon being flashed to one atmosphere was found to evolve 4.7 c.f. of carbon dioxide per gallon solution with a purity of 97.4 percent (2.6 percent hydrogen).

The use of air stripping was also evaluated with the above flashed solution conducted in a 27 tray stripper. Using an air to solution rate of 2 s.c.f. per gallon, a lean solution was prepared that lowered the absorber off gas from 5.0 percent carbon dioxide to 0.1 percent carbon dioxide, and increased the net absorption capacity of the solution from 4.7 to 5.2 s.c.f. per gallon. By varying the amount of air fed to the stripper over the 0–2 s.c.f. per gallon range it was found possible to accurately control the absorber overhead gas composition between 0.1 and 5.0 percent carbon dioxide. An air stripping rate of 3 s.c.f. per gallon on the other hand was satisfactory for removal of carbon dioxide in the absorber overhead to the 0.01 percent level.

Example II

In the case cited in example one, a 150 p.s.i.g. high pressure flash was used and the bulk of the hydrogen was removed as an 82 percent carbon dioxide-18 percent hydrogen mixture. The net solution then was flashed at atmospheric pressure to produce a 99.5 percent pure carbon dioxide. The use of a high pressure flash thus purified the carbon dioxide to a point where it could be used for chemical purposes with the loss of only a small fraction of the carbon dioxide. By utilizing a 70 p.s.i.g. flash approximately one-third the absorbed carbon dioxide was flashed as a 92 percent carbon dioxide-8 percent hydrogen mixture and the subsequent atmospheric flash analyzed 99.9 percent pure. The use of a flash of this type is suitable where a fraction of the carbon dioxide is desired in pure form or some use (such as fuel or recycle) is attached to the high pressure flashings.

We claim:
1. The process of recovering carbon dioxide from a feed gas mixture containing carbon dioxide and other gas of the group consisting of natural gas components, hydrogen, nitrogen, oxygen, moisture, hydrogen sulfide, sulfur dioxide and carbonyl sulfide, that includes passing the feed gas through an absorption zone at super atmospheric pressure in counter-flowing contact with an ether acetate of the group consisting of butoxy diethylene glycol acetate and methoxy triethylene glycol acetate and thereby preferentially absorbing carbon dioxide in the acetate, removing unabsorbed components of the feed gas from said zone, separately removing therefrom a stream of the rich acetate and reducing the pressure thereof in a separating zone to flash off carbon dioxide, and thereafter recycling the acetate to said absorption zone for counter-flow contact with said feed gas.

2. The process of claim 1, in which removal of carbon dioxide from the rich carbonate occurs without the addition of heat thereto.

3. The process of claim 1, in which the acetate is butoxy diethylene glycol acetate.

4. The process of claim 1, in which the acetate is methoxy triethylene glycol acetate.

5. The process of claim 1, in which the initial carbon dioxide partial pressure in the absorption zone is between about 40 and 600 p.s.i.

6. The process of claim 5, in which the acetate temperature in the base of the absorption zone is between about 30° F. and 120° F.

7. The process of claim 6, in which the acetate is butoxy diethylene glycol acetate.

8. The process of claim 6 in which moisture is absorbed with the carbon dioxide and is separated therewith in the flash off from said separating zone.

9. The process of claim 6, in which an acid gas component of the feed other than carbon dioxide is absorbed with the carbon dioxide and is separated therewith in the flash off from said separating zone.

10. The process of claim 6, in which the flash off of inert gases from the acetate occurs in successive higher and lower pressure separating zone and from the first of which is removed a mixture rich in components more volatile than carbon dioxide.

11. The process of claim 6, in which the acetate from said separating zone is stripped with an inert gas for removal of any residual carbon dioxide before the lean acetate is returned to said absorption zone.

(References on following page)

References Cited in the file of this patent

UNITED STATES PATENTS

| | | |
|---|---|---|
| 2,540,905 | Neubauer et al. | Feb. 6, 1951 |
| 2,630,405 | Frazier | May 12, 1953 |
| 2,649,166 | Porter et al. | Aug. 18, 1953 |
| 2,781,862 | Fussman | Feb. 19, 1957 |

OTHER REFERENCES

"Solubilities of Inorganic and Organic Compounds," Seidell, volume 1, 2nd edition, Van Nostrand Inc., New York, N.Y., 1919, pages 233 and 234.